(12) United States Patent
Downey et al.

(10) Patent No.: US 10,724,504 B1
(45) Date of Patent: Jul. 28, 2020

(54) SYSTEMS AND METHODS FOR LEADING EDGE SENSORS IN WIND TURBINES

(71) Applicants: Austin Robert Johnson Downey, Ames, IA (US); Simon Laflamme, Ankeny, IA (US); Randall Lee Geiger, Ames, IA (US)

(72) Inventors: Austin Robert Johnson Downey, Ames, IA (US); Simon Laflamme, Ankeny, IA (US); Randall Lee Geiger, Ames, IA (US)

( * ) Notice: Subject to any disclaimer, the term of this patent is extended or adjusted under 35 U.S.C. 154(b) by 100 days.

(21) Appl. No.: 16/008,617

(22) Filed: Jun. 14, 2018

(51) Int. Cl.
  *F03D 17/00* (2016.01)
  *H01C 7/00* (2006.01)
  *G01N 27/04* (2006.01)

(52) U.S. Cl.
  CPC .......... *F03D 17/00* (2016.05); *F05B 2270/80* (2013.01); *G01N 27/041* (2013.01); *H01C 7/003* (2013.01)

(58) Field of Classification Search
  USPC ................................. 324/700, 691, 693, 696
  See application file for complete search history.

(56) References Cited

U.S. PATENT DOCUMENTS

| | | | |
|---|---|---|---|
| 8,540,936 B2 | 9/2013 | Hefner et al. | |
| 2014/0155528 A1* | 6/2014 | Onoue | C08K 3/22 524/127 |
| 2019/0024532 A1* | 1/2019 | Dardona | F01D 5/12 |
| 2019/0072511 A1* | 3/2019 | Warren | G01N 27/20 |

OTHER PUBLICATIONS

Sharpley, Nic. "Protecting blades against leading edge erosion". https://www.windpowerengineering.com/business-news-projects/featured/protecting-blades-leading-edge-erosion. Sep. 23, 2013; 8 pages.

* cited by examiner

*Primary Examiner* — Vincent Q Nguyen
(74) *Attorney, Agent, or Firm* — Bejin Bieneman PLC

(57) ABSTRACT

A leading edge sensor is disclosed. The leading edge sensor may include a tape section and a sensor configured to be disposed on the tape section. The leading edge sensor also includes a first electrode connected to a first end of the sensor and a second electrode connected to a second end of the sensor. The tape section is configured to be attached to a leading edge of at least one blade of a wind turbine, and the sensor configured to detect wear associated with the leading edge.

16 Claims, 7 Drawing Sheets

SYSTEMS AND METHODS FOR LEADING EDGE SENSORS IN WIND TURBINES

FIELD

The present disclosure relates to wind turbine sensors, and more particular to a leading edge sensor and system to remotely detect a condition of a sensor disposed over a blade of a wind turbine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wind power is the process by which the wind is used to generate electricity. Wind turbines convert the kinetic energy in the wind into mechanical power and a generator then converts this mechanical power into electricity.

Wind turbine blades are exposed to a variety of adverse conditions and a wide number of airborne objects. These may include, but are not limited to rain, ice droplets, dust, bugs, bats, and birds. Blade wear comes from multiple sources including: erosion, impacts, and lightning. Blade wear is proportional to the relative velocity of the blade. Modern large scale turbines operating at their nameplate power can have a blade tip speed approaching 200 MPH.

Wind turbine blades can account for 15-20% of the total cost of a turbine system, and are the most expensive components to repair in situ. Blades are complex and expensive; a 35-meter blade can cost $150,000 excluding shipping and installation. Blade maintenance makes up a large portion of the maintenance of a wind turbine. Data from European wind farms suggests that blades have the highest failure rate of all the complex systems of a wind turbine and that blade failures result in extended down times.

Erosion of the leading edge of wind turbine blades is generally considered to be the distributed wear of blade caused by airborne particles. These elements can erode the leading edge of a turbine blade, resulting in an increase in surface roughness and a decrease in power production. Lightning strikes tend to contact the tips of the blades, and can result in fires and other catastrophic failures of the entire wind turbine system.

Impacts or strikes to wind turbine blades can cause localized damage. This damage, like that of erosion, can cause an increase in surface roughness and a decrease in power production. Additionally, impacts can cause the loss of blade material creating a rotating mass imbalance that can cause catastrophic damage to the whole turbine system if left unrepaired. By far, the greatest sources of impacts are of the avian kind. The U.S. Fish and Wildlife service estimates the potential for about 30,000 bats strikes per year in the state of Illinois alone.

SUMMARY

A leading edge sensor is disclosed. The leading edge sensor may include a tape section and a sensor configured to be disposed on the tape section. The leading edge sensor also includes a first electrode connected to a first end of the sensor and a second electrode connected to a second end of the sensor. The tape section is configured to be attached to a leading edge of at least one blade of a wind turbine, and the sensor configured to detect wear associated with the leading edge.

In other features, the sensor is configured to detect wear associated with the tape section.

In other features, the sensor is disposed on a non-adhesive portion of the tape section.

In other features, the sensor is disposed on an adhesive portion of the tape section.

In other features, the sensor comprises a resistor.

In other features, the sensor comprises a thick film resistor.

A system is also disclosed. The system can include a wind turbine that includes a plurality of blades, wherein each blade of the plurality of blades includes a leading edge sensor. The system also includes a sensor module that includes a measuring module configured to measure a resistance of each of the leading edge sensors and a reporting module configured to transmit wear information to a wind turbine operator. The wear information is based on the measured resistances and each leading edge sensor includes (i) a first electrode, (ii) a second electrode, and (iii) a resistor that electrically connects the first electrode to the second electrode.

In other features, the resistor includes carbon black, styrene ethylene butylene styrene (SEBS), and toluene.

In other features, each leading edge sensor includes a section of leading edge tape, the first electrode is positioned near a first edge of the section of leading edge tape, and the second electrode is positioned near a second edge of the section of leading edge tape In other features, the sensor module includes a storage module configured to store a plurality of impact flags for each blade of the plurality of blades.

In other features, the plurality of impact flags includes a first impact flag that indicates whether the blade has sustained a type one impact, a second impact flag that indicates whether the blade has sustained a type two impact, and a third impact flag that indicates whether the blade has sustained a type three impact.

In other features, the storage module is further configured to store an erosion flag that indicates whether a roughness of the plurality of blades is greater than a predetermined threshold.

In other features, the reporting module is configured to transmit a status of the impact flags and the erosion flag stored in the storage module to the wind turbine operator.

In other features, the sensor module includes a monitoring module configured to determine whether the sensor module has been previously started, and in response to determining that the sensor module has not been previously started: for each blade of the plurality of blades: store the measured resistance of the leading edge sensor of the blade as a start resistance in the storage module, for each impact flag of the plurality of impact flags of the blade stored in the storage module, set a value of the impact flag to zero, set a value of the erosion flag stored in the storage module to zero, calculate an average value of the stored start resistances, and store the calculated average value of the stored start resistances in the storage module.

In other features, the monitoring module is configured to, for each blade of the plurality of blades, store the measured resistance of the leading edge sensor of the blade in the storage module as a stored current resistance, and the sensor module includes an impact module configured to for each blade of the plurality of blades: compare the stored current resistance with a first threshold value, in response to determining that the stored current resistance is greater than or equal to the first threshold value, compare the stored current resistance with a second threshold value, in response to determining that the stored current resistance is greater than or equal to the second threshold value, set the value of the third impact flag of the plurality of impact flags of the blade to one, in response to determining that the stored current resistance is less than the second threshold value, (i) delay for a predetermined recovery period, (ii) receive the resistance of the leading edge sensor of the blade from the measuring module, and (iii) compare the received resistance with the stored current resistance, in response to determining that the received resistance is greater than or equal to the stored current resistance, (i) set the value of the first impact flag of the plurality of impact flags of the blade to one and (ii) store the received resistance as the stored current resistance of the blade in the storage module, and in response to determining that the received resistance is less than the stored current resistance, (i) set the value of the second impact flag of the plurality of impact flags of the blade to one and (ii) store the received resistance as the stored current resistance of the blade in the storage module.

In other features, the monitoring module is configured to, for each blade of the plurality of blades, store the measured resistance of the leading edge sensor of the blade in the storage module as a stored current resistance, and the sensor module includes an erosion module configured to: calculate an average of the stored current resistances of the plurality of blades, compare the calculated average of the stored current resistances to a fourth threshold value, wherein the fourth threshold value is equal to the average value of the stored start resistances plus a predetermined erosion factor, and in response to determining that the calculated average of the stored current resistances is equal to or greater than the fourth threshold value, set the value of the erosion flag stored in the storage module to one.

A system is also disclosed. The system can include a wind turbine that includes a plurality of blades, wherein each blade of the plurality of blades includes a leading edge sensor. The system also includes a sensor module that includes a measuring module configured to measure a resistance of each of the leading edge sensors and a reporting module configured to transmit wear information to a wind turbine operator. The wear information is based on the measured resistances and each leading edge sensor includes (i) a first electrode, (ii) a second electrode, and (iii) a resistor that electrically connects the first electrode to the second electrode. Each lead edge sensor also includes a section of leading edge tape. The first electrode is positioned near a first edge of the section of leading edge tape, and the second electrode is positioned near a second edge of the section of leading edge tape.

In other features, the sensor module includes a storage module configured to store a plurality of impact flags for each blade of the plurality of blades.

In other features, the plurality of impact flags includes: a first impact flag that indicates whether the blade has sustained a type one impact, a second impact flag that indicates whether the blade has sustained a type two impact, and a third impact flag that indicates whether the blade has sustained a type three impact.

In other features, the storage module is further configured to store an erosion flag that indicates whether a roughness of the plurality of blades is greater than a predetermined threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The modern wind industry has developed multiple solutions for dealing with the degradation of wind turbine blades. Leading edge tape has emerged as a viable protection mechanism for the protection of the leading edge of a blade. Some industry experts recommend that leading edge tape be installed as a required feature at the time of blade installation. An example of a leading edge tape is Wind Blade Protection Tape W8607 by 3M™.

Hub heights and swept areas of modern wind turbines continue to grow. The trend is leading to larger turbine swept areas, on taller hubs in more remote conditions. The standard solutions of blade inspections used today will become cost prohibitive. Other methods currently under development such as the use of cameras mounted on drones to inspect blades will be hindered by the size and increasing inaccessibility of these large wind turbines.

In addition, the challenges in offshore wind turbines are substantially greater than those of shore based turbines. Offshore wind turbines tend to be larger so as to take advantage of the greater wind potential. This increase in size, combined with the remote conditions, add substantial cost to offshore turbine blades.

Remote and small scale utilities are considered to be utilities that are not connected to a larger grid, such as rural Alaska, or islands located around the country. In recent years, due in part to the increasing cost and price volatility of diesel fuel, there has been a significant increase in the number of turbines in these remote locations. Turbine manufactures have developed successful business models developing wind turbines for this market. Due to the increase in the turbine installation and maintenance costs, there is a need for remote damage detection of wind turbine blades.

The present disclosure is directed to a sensor that is affixed to the leading edge of the blades of a wind turbine and a system that monitors wear of the blades based on changes in resistance of the sensors. The disclosed sensor and system allow for the offsite monitor of wind turbines. Thus, the leading edge sensor and monitoring system in accordance with the present disclosure, provide for the convenient, centralized monitoring of remotely located wind turbines.

Figure 1:
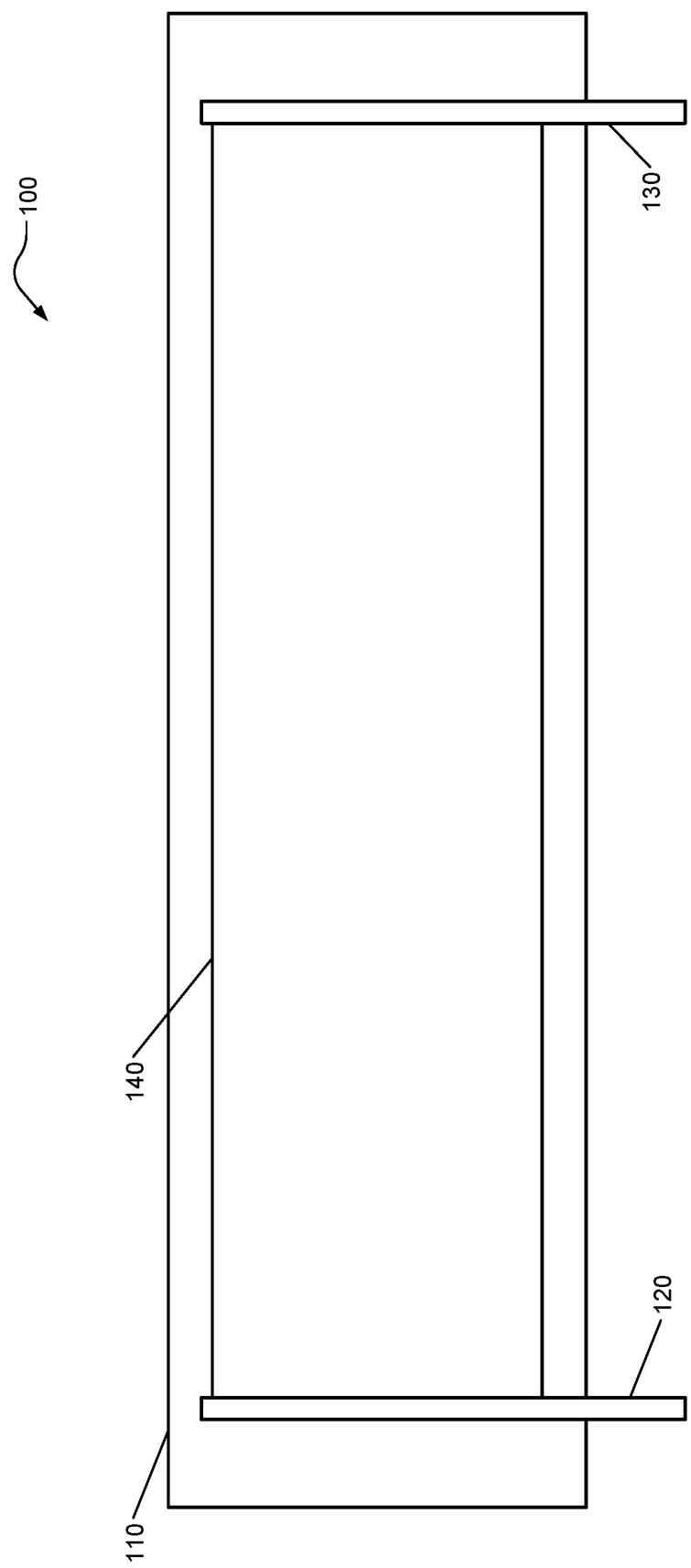
FIG. 1 illustrates a schematic diagram of a leading edge sensor according to the principals of the present disclosure.

FIG. 1 illustrates an example block diagram of a leading edge sensor 100 in accordance with the principles of the present disclosure. The leading edge sensor 100 includes a tape section 110 with an adhesive side and a non-adhesive side. In one example implementation, the tape section 110 is a section of 3M™ Wind Blade Protection Tape W8607. In other implementations, the tape section 110 may be a section of another tape suitable to protect wind turbine blade surfaces from damage. The leading edge sensor 100 also includes a first electrode 120 positioned near a first edge of the tape section 110 and a second electrode 130 positioned near a second edge of the tape section 110. The first electrode 120 and the second electrode 130 are positioned on the adhesive side of the tape section 110. The leading edge sensor 100 further includes a resistor 140 positioned between the first electrode 120 and the second electrode 130. The resistor 140 electrically connects the first electrode 120 to the second electrode 130. In one example implementation, the resistor 140 is a thick-film resistor. For instance, the resistor may comprise carbon black, styrene ethylene butylene styrene (SEBS), and/or toluene mixture. In other implementations, the resistor 140 may be another suitable resistive material.

Figure 2:
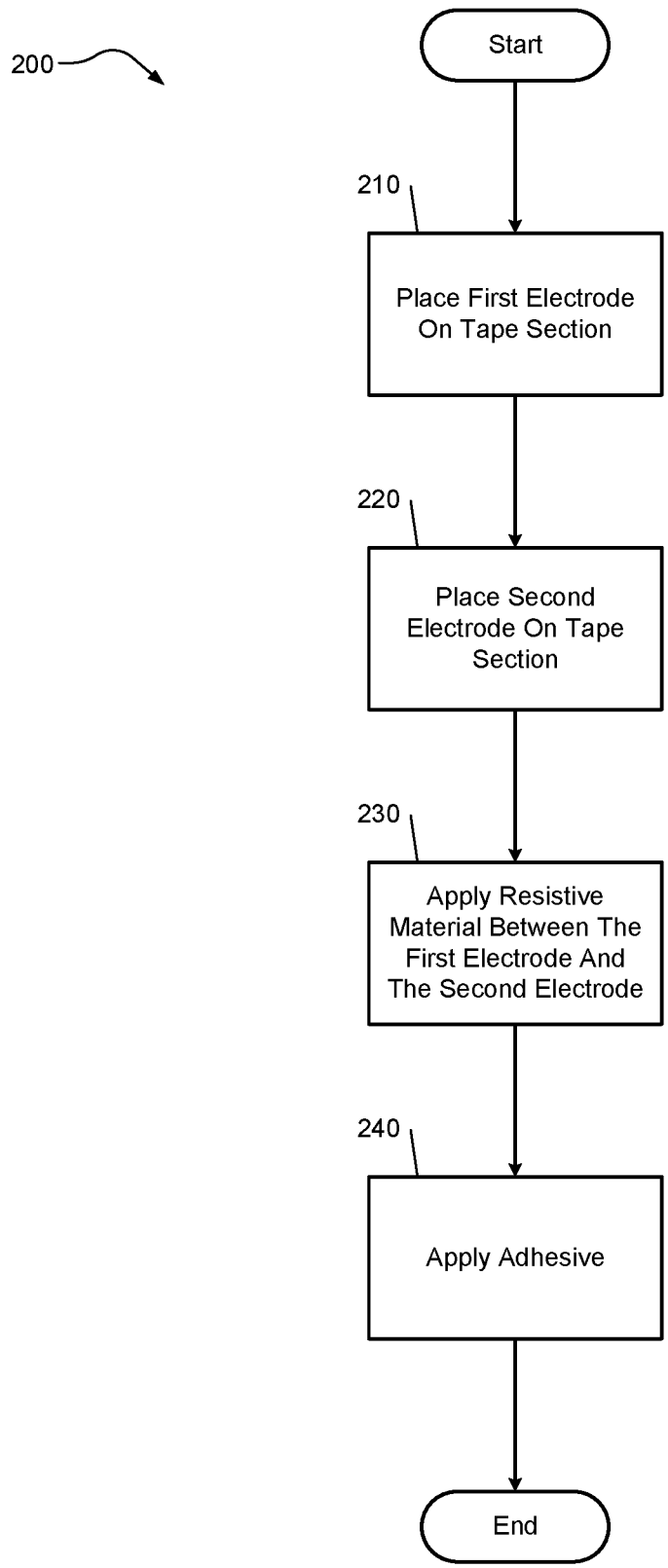
FIG. 2 illustrates a method for making a leading edge sensor according to the principals of the present disclosure.

FIG. 2 illustrates one example method 200 of making a wind turbine leading edge sensor, for example the leading edge sensor 100. The method begins at 210 where the first electrode 120 is placed on the adhesive side of the tape section 110 near a first edge of the tape section 110. The method then continues with 220. At 220, the second electrode 130 is placed on the adhesive side of the tape section 110 near a second edge of the tape section 110, wherein the second edge is opposite to the first edge. The method then continues with 230. At 230, the resistor 140 is formed by applying a resistive material between the first electrode 120 and the second electrode 130. In one example implementation, the resistor 140 is formed by screen printing a carbon black, SEBS, and toluene mixture onto the adhesive side of the tape section 110. The method concludes with 240. At 240, an adhesive is applied to the first electrode 120, the second electrode 130, and the resistor 140. In some implementations, the adhesive is also applied to the portions of the adhesive side of the tape section 110 that are not covered by the first electrode 120, the second electrode 130, or the resistor 140. In one example implementation, the applied adhesive is Super 77™ spray adhesive by 3M™.

Figure 3:
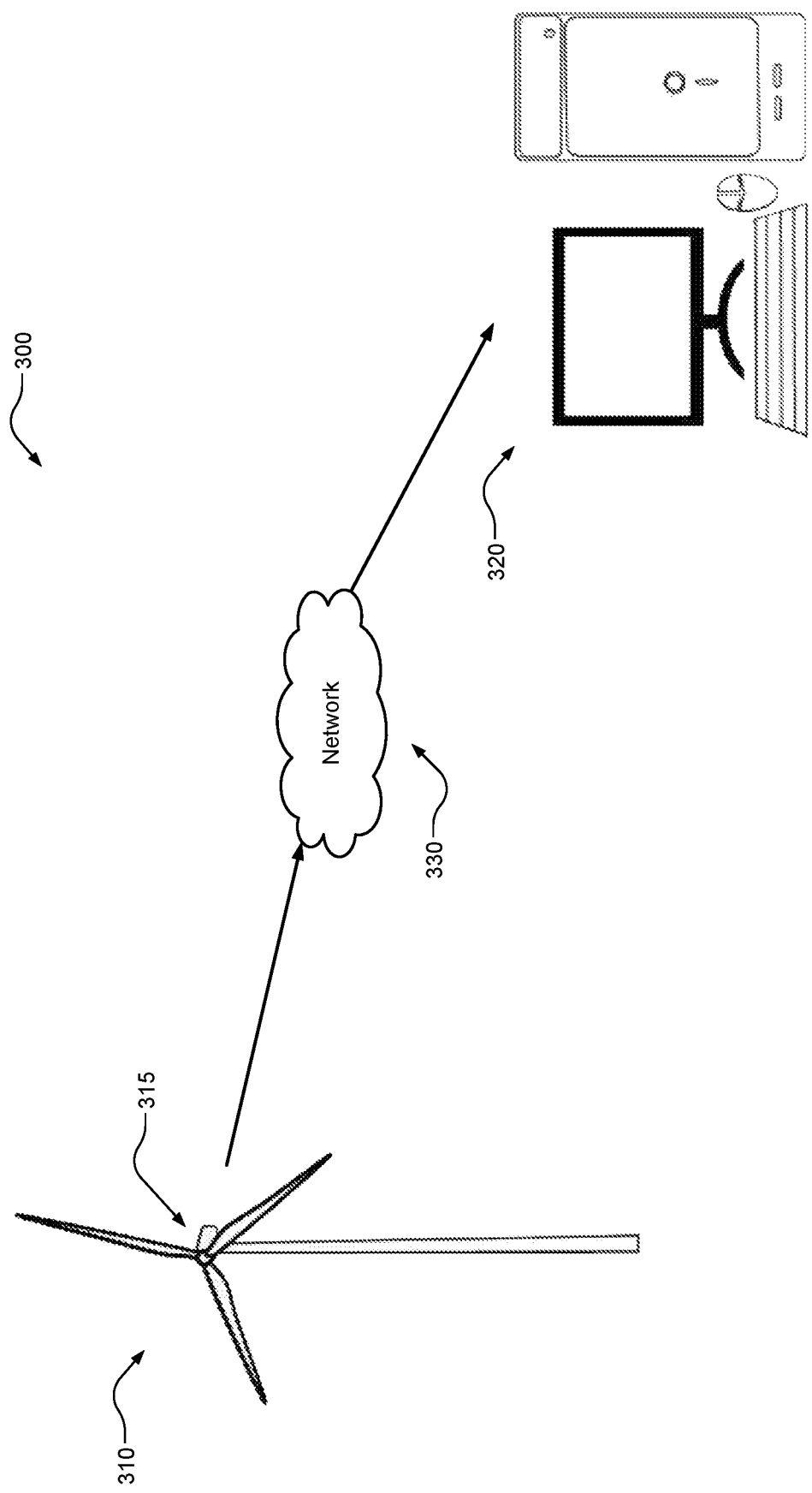
FIG. 3 illustrates a block diagram of leading edge sensor system according to the principals of the present disclosure.

FIG. 3 illustrates a leading edge sensor system 300 according to the principles of the present disclosure. The leading edge sensor system 300 includes a wind turbine 310 that has a plurality of blades. Although in FIG. 1 the wind turbine 310 is depicted as having three blades, the wind turbine 310 may have a different number of blades. For example, the wind turbine 310 may have either (i) two blades or (ii) four or more blades. Each blade of the wind turbine 310 includes a sensor, for example the leading edge sensor 100, adhered to the leading edge of the blade. The leading edge sensor system 300 also includes a sensor module 315 configured to measure and store resistances of the sensors on each blade of the wind turbine 310. The sensor module 315 is further configured to transmit information associated with the condition of the blades to a wind turbine operator 320 via a network 330. The network 330 is a distributed communications network that may include wired or wireless local area networks (LANs), wide area network (WANs), the Internet, or combinations thereof. In an example implementation, the sensor module 315 uses a supervisory control and data acquisition (SCADA) system to transmit the information associated with the condition of the blades to the wind turbine operator 320. In some implementations, the wind turbine operator 320 may also store and receive information from other wind turbines in addition to the wind turbine 310.

Figure 4:
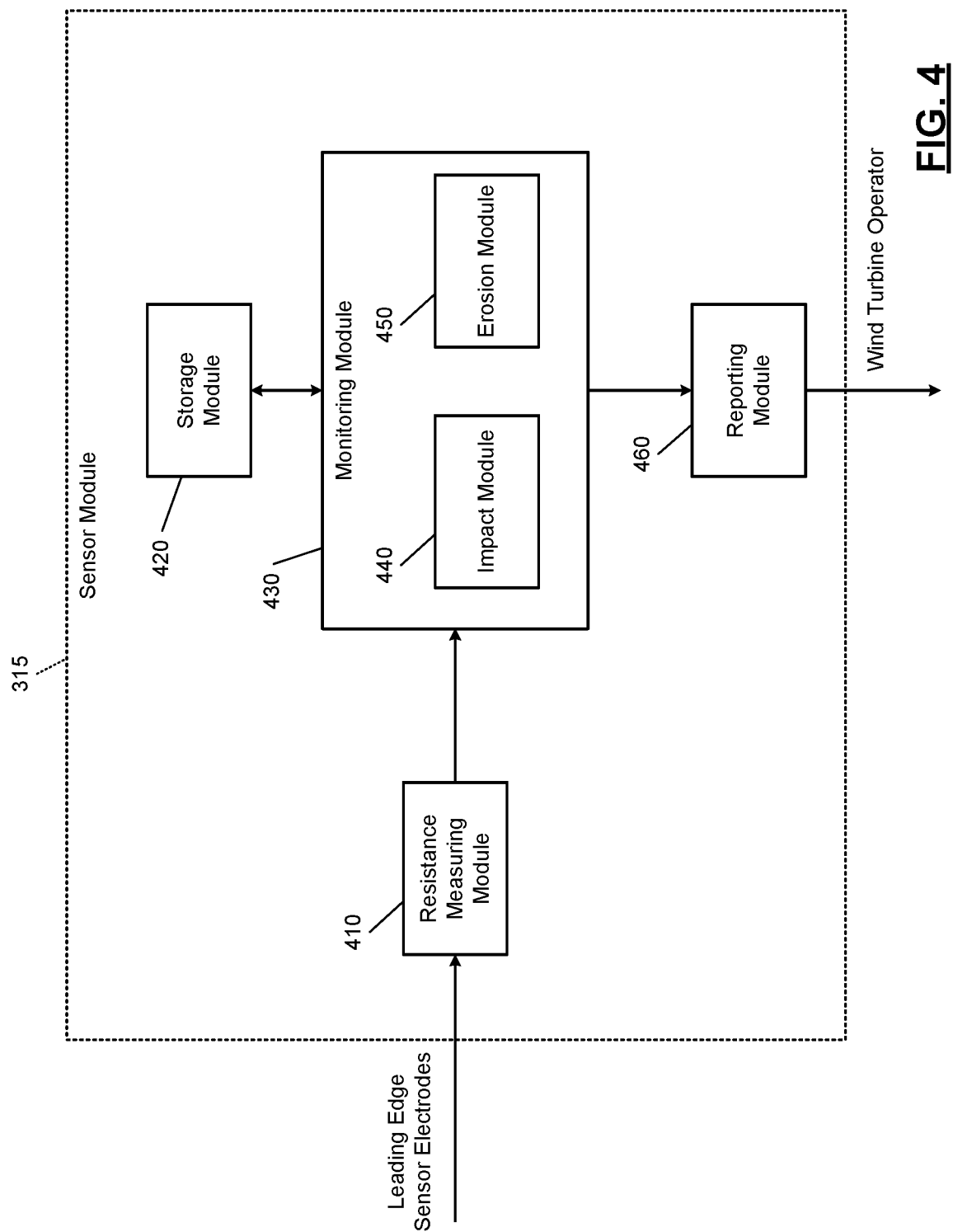
FIG. 4 illustrates a block diagram of a sensor module according to the principals of the present disclosure.

FIG. 4 illustrates an example block diagram of the sensor module 315. The sensor module 315 includes a resistance measuring module 410, a storage module 420, and a monitoring module 430. The resistance measuring module 410 is configured to measure the current resistance between the first electrode and the second electrode of the leading edge sensor of each blade of the wind turbine 310 and provide the measured resistance to the monitoring module 430.

The storage module 420 is configured to store information related to the wind turbine 310. The information may include resistance values, a system start flag, impact flags, and an erosion flag. The monitoring module 430 is configured to determine whether the sensor module 315 has been previously started based on the status of the system start flag stored in the storage module 420. In response to determining that the system start flag indicates that the sensor module 315 has not been previously started, the monitoring module 430 stores the current resistance of the leading edge sensor of each blade as the start resistance of the blade and initializes all impact and erosion flags associated with the leading edge sensor system 300. For example, the monitoring module 430 may change the values of the impact flags associated with each blade and the erosion flag to zero.

The monitoring module 430 is configured to, in response to storing the start resistance of each blade, change the value of the system start flag stored in the storage module 420 to a value that indicates that sensor module has been started. For example, the monitoring module 430 may change the value of the system start flag to one. The monitoring module 430 is further configured to, in response to either (i) determining that the start flag indicates that the sensor module 315 has been previously started or (i) changing the value of the start flag to a value that indicates that the sensor module 315 has been previously started, determine the average value of the stored start resistances and store the determined average value in the storage module 420 as the start average.

The monitoring module 430 includes an impact module 440 and an erosion module 450. The impact module 440 is configured to determine whether any of the blades of the wind turbine 310 have sustained an impact based on current sensor resistances, stored sensor resistances, and threshold values. The impact module 440 is configured to determine if any one of three different types of impact (a type one impact, a type two impact, or a type three impact) has occurred and changes the values of the impact flags stored in the storage module 420, accordingly. A type one impact is an impact to a blade of the wind turbine 310 that causes little to no damage to the blade. A type one impact momentarily increases the resistance of the leading edge sensor, but does not result in a tear or hole in the resistor 140 of the leading edge sensor. A type two impact is an impact to a blade of the wind turbine 310 that causes damage to the blade. A type two impact results in a tear or hole in the resistor 140 that increases the resistance of the leading edge sensor. A type three impact is a lighting strike to a blade of the wind turbine. A type three impact results in the destruction of the resistor 140 and causes the first electrode 120 to not be electrically connected to the second electrode 130.

The erosion module 450 is configured to determine whether the blades of the wind turbine 310 have sustained erosion damage based on a detected, even increase in resistance of all leading edge sensors. The erosion module 450 determines a current average value of current resistances of the leading edge sensors. The erosion module 450 then compares the current average with start average stored in the storage module 420. Specifically, the erosion module 450 determines if the current average value is greater than or equal to the start average plus a predetermined erosion factor. The predetermined erosion factor is a value specific to the size and configuration of the wind turbine 310 and represents a resistance increase that indicates a significant increase in surface roughness of the blades of the wind turbine 310. The erosion module 450 is configured to, in response to determining that the current average value is greater than or equal to the start average plus the predetermined erosion factor, change the value of the erosion flag stored in the storage module 420 to a value that indicates that the blades of the wind turbine 310 have sustained erosion damage. For example, the erosion model 450 may change the value of the erosion flag to one.

The sensor module 315 also includes a reporting module 460 configured to transmit information regarding the wind turbine 310 to the wind turbine operator 320 via the network 330. Specifically, the reporting module 460 transmits the status of each of the impact flags and the erosion flag stored in the storage module 420. In some implementations, the reporting module may also transmit the current resistance values of the leading edge sensors of the wind turbine 310 to the wind turbine operator 320. The wind turbine operator 320 may store the received resistance values of the wind turbine 310 and use the stored values to detect additional wear and damage conditions of the wind turbine 310.

Figure 5:
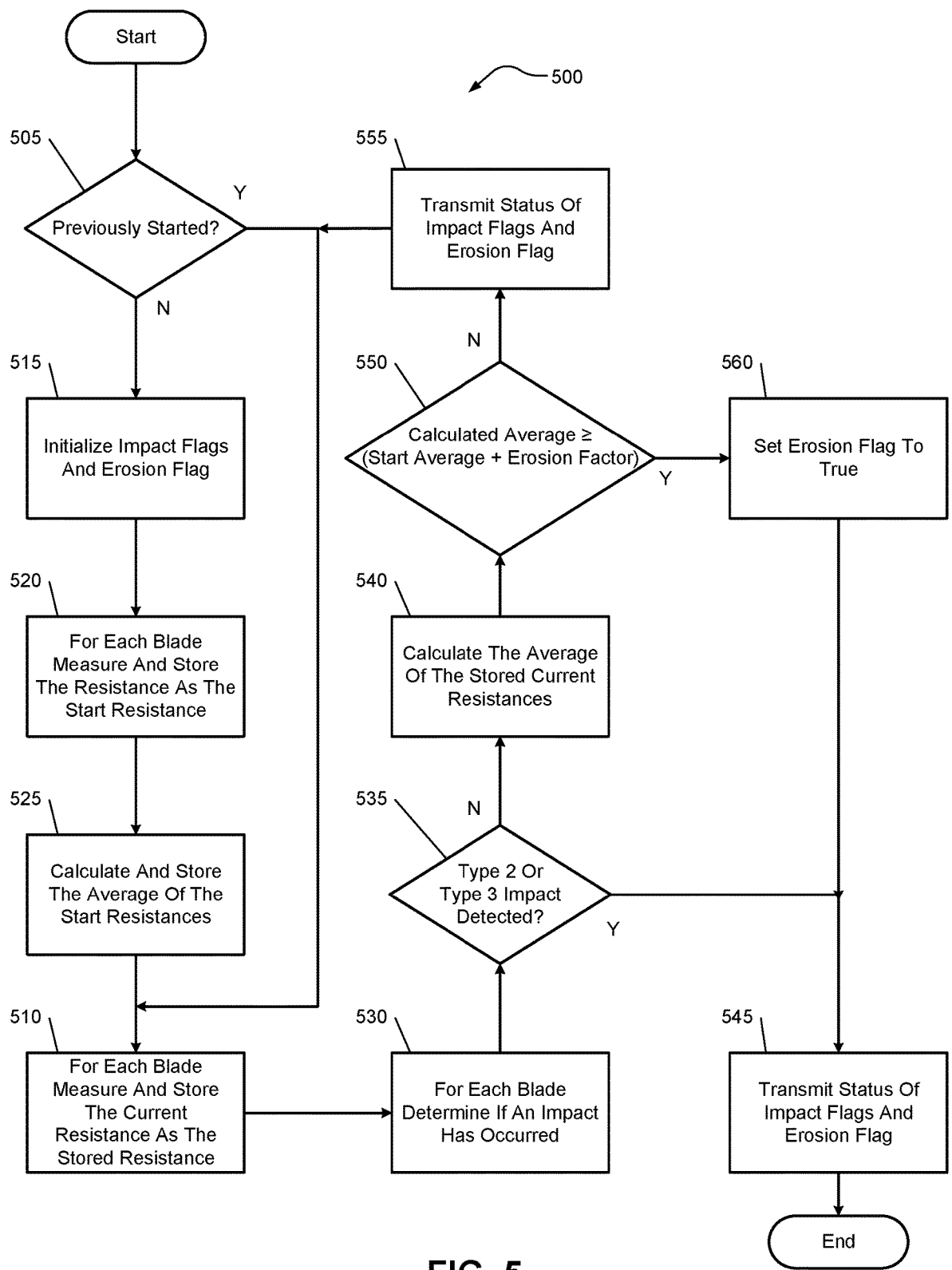
FIG. 5 illustrates a method, according to the principals of the present disclosure, for using leading edge sensors to monitor wear of wind turbine blades.

With continued reference to FIGS. 1, 3, and 4 and additional reference to FIG. 5, a method according to the present teachings for using leading edge sensors, such as the leading edge sensor 100, to monitor wear of wind turbine blades is generally illustrated at reference numeral 500. The method 500 may be performed by the sensor module 315, or by any other suitable system or module.

Control begins at 505. At 505, the monitoring module 430 determines if the sensor module 315 has been previously started. The monitoring module 430 bases the determination on the status of the system start flag stored in the storage module 420. If 505 is true, control continues with 510, as described below. If 505 is false, control progresses to 515. At 515, the sensor module 315 initializes all impact flags and the erosion flag stored in the storage module 420. For example, the monitoring module 430 changes the value of the impact and erosion flags stored in the storage module 420 to zero. Control then continues to 520.

At 520, the sensor module 315 measures and records the start resistances of all the leading edge sensors. For example, for each blade of the wind turbine 310, the monitoring module 430 receives the current resistance value of the leading edge sensor affixed to the blade and stores the value in the storage module 420 as the start resistance of the blade. The monitoring module receives the current resistance values from the resistance measuring module 410. Control then continues with 525. At 525, the monitoring module 430 calculates the average of start resistances stored in the storage module 420 and stores the result in the storage module 420 as the start average. Control then progress to 510.

At 510, the monitoring module 430 receives the current resistance of each sensor from the resistance measuring module 410 and stores the value in the storage module 420 as the current resistance of the blade associated with the sensor. Control then progresses to 530. At 530, the sensor module 315 determines if any of the blades have sustained an impact. The sensor module bases the determination on current and stored resistances. In an example implementation, the sensor module 315 preforms the method illustrated in FIG. 6, as described below, to determine if an impact has occurred. Control then moves to 535.

At 535, the sensor module 535 determines whether either a type two or a type three impact has occurred. For example, the monitoring module 430 determines if any of the type two or type three impact flags stored in the storage module 420 have a value other than zero. If 535 is false, control continues with 540, as described below. If 535 is true, control continues with 545. At 545, the sensor module 315 sends the status of wind turbine 310. For example, the reporting module 460 transmits the values of all impact and erosion flags stored in the storage module 420 to the wind turbine operator 320. Control then ends.

At 540, the sensor module 315 calculates the average of the current resistance values of the leading edge sensors. Control then progress to 550. At 550, the sensor module 315 determines if the blades of the wind turbine 310 are eroded. For example, the erosion module 450 compares the average of the current resistances with the start average stored in the storage module 420. The erosion module 450 determines that blade erosion has occurred in response to the average of the current resistances being greater than or equal to the start average plus the predetermined erosion factor. If 550 is true, control progress to 560, as described below. If 550 is false, control continues with 555. At 555, the reporting module 460 transmits the values of the impact and erosion flags stored in the storage module 420. Control then returns to 510, as previously described.

At 560, the sensor module 315 sets the erosion flag to true. For example, erosion module 450 changes the value of the erosion flag stored in the storage module 420 to one. Control than progress to 545, as previously described.

Figure 6:
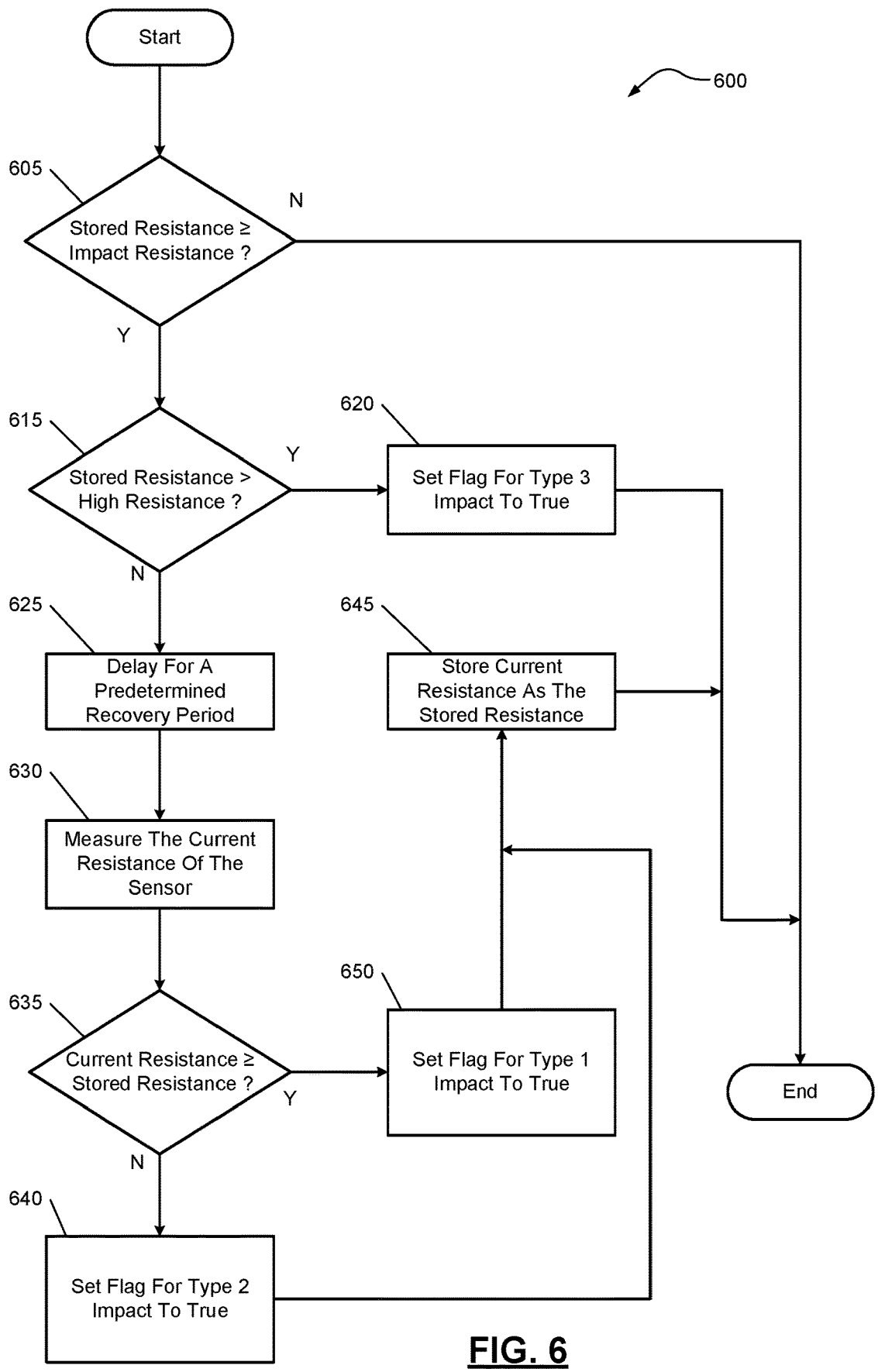
FIG. 6 illustrates a method, according to the principals of the present disclosure, for using leading edge sensors to determine that a blade of a wind turbine has sustained an impact.

With continued reference to FIGS. 1 and 3-5 and additional reference to FIG. 6, a method according to the present teachings for determining whether a blade of a wind turbine, such as the wind turbine 310, has sustained an impact is generally illustrated at reference numeral 600. The method 600 may be performed by the sensor module 315, or by any other suitable system or module.

Control begins at 605. At 605, the sensor module 315 determines if the current resistance of the leading edge sensor associated with the blade is greater than or equal to an impact resistance. The impact module 440 calculates the impact resistance by adding a predetermined impact threshold value to the stored resistance associated with the blade in the storage module 420. The impact module 440 then determines if the current resistance of the leading edge sensor provided by the resistance measuring module 410 is greater than or equal to the calculated impact resistance. If 605 is false, control ends. If 605 is true, control continues to 615.

At 615, the impact module 440 determines if the current resistance of the leading edge sensor provided by the resistance measuring module 410 is greater than a predetermined high resistance value. The predetermined high resistance value is a resistance value that represents a faulty or inoperative leading edge sensor. As an example, the predetermined high resistance value maybe a resistance value that is at least three orders of magnitude higher than the start resistance of the leading edge sensor. If 615 is false, control continues with 625, as described below. If 615 is true, control transfers to 620. At 620, the monitoring module 430 sets the type three impact flag stored in the storage module 420 associated with the blade to true. For example, the monitoring module 430 changes the value of the type three impact flag to one. Control then ends.

At 625, the sensor module 315 delays for a predetermined recovery period. In an example implementation, the predetermined recovery period is equal to 25 seconds. In other implementations, the predetermined recovery period may be any other length of time sufficient to allow any increase in resistance of the leading edge sensor due to a type one impact to subside. Control then progresses to 630. At 630, the monitoring module 430 stores the value of the current resistance of the leading edge sensor provided by the resistance measuring module 410 as the stored resistance associated with the blade in the storage module 420. Control then progresses to 635.

At 635, the impact module 440 determines if the current resistance of the leading edge sensor provided by the resistance measuring module 410 is greater than or equal to the stored resistance associated with the blade in the storage module 420. If 635 is false, control continues with 640. At 640, the monitoring module 430 sets the type two impact flag associated with the blade that is stored in the storage module 420 to true. For example, the monitoring module 430 changes the value of the type two impact flag to one. Control then progress to 645. At 645, the monitoring module 430 stores the value of the current resistance of the leading edge sensor provided by the resistance measuring module 410 as the stored resistance associated with the blade in the storage module 420. Control then ends.

If 635 is true, control transfers to 650. At 650, the monitoring module sets the type one impact flag stored in the storage module 420 that is associated with the blade to true. For example, the monitoring module 430 changes the value of the type one impact flag to one. Control then progress to 645. At 645, the monitoring module 430 stores the value of the current resistance of the leading edge sensor provided by the resistance measuring module 410 as the stored resistance associated with the blade in the storage module 420. Control then ends.

Figure 7:
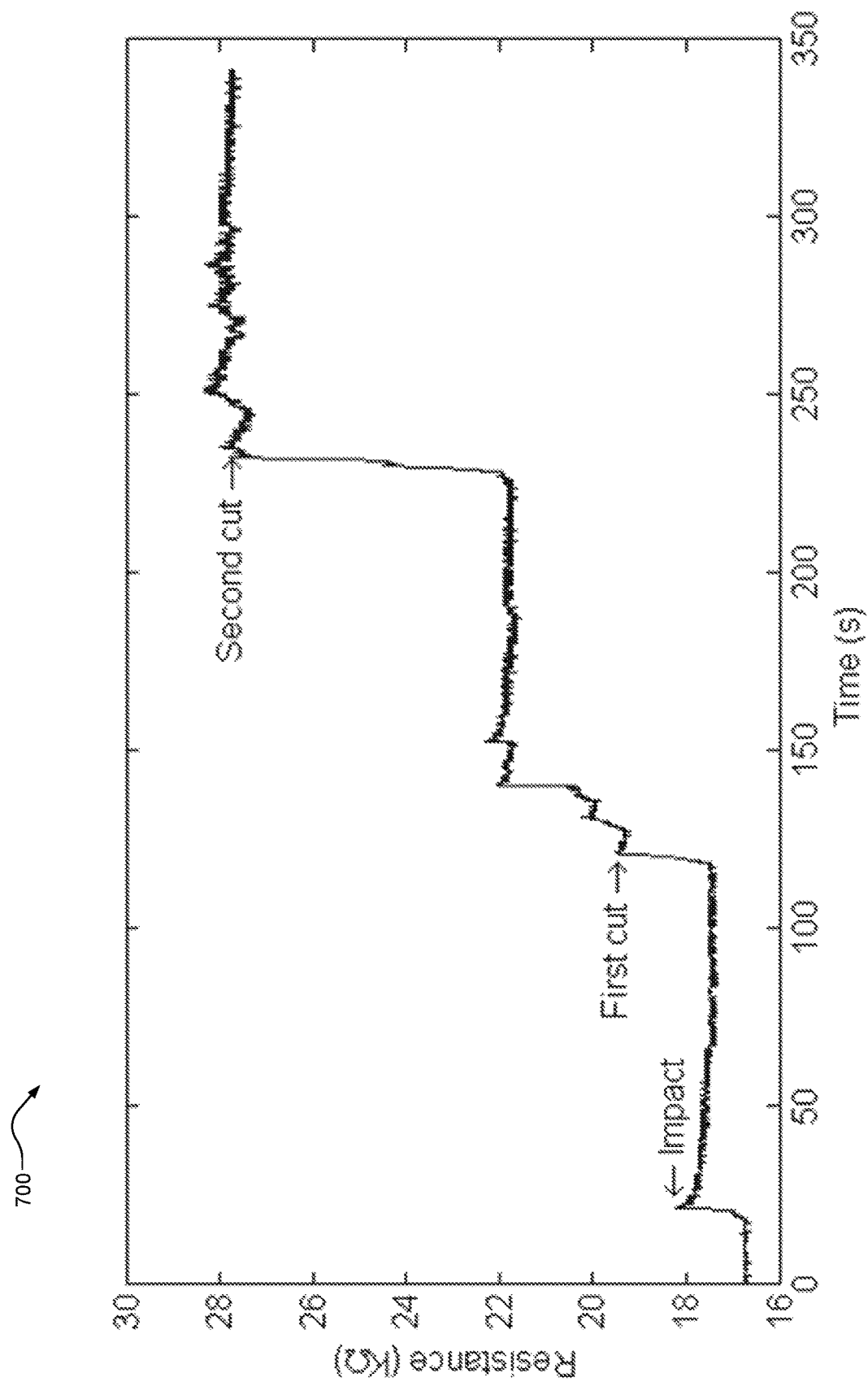
FIG. 7 is a graph that depicts the change in resistance of an example leading edge sensor in accordance with an example implementation of the present disclosure.

FIG. 7 illustrates a graph 700 that depicts changes in resistance of an example leading edge sensor according to the principles of the present disclosure. In graph 700, the label "Impact" denotes a concentrated force applied to the example leading edge sensor. The concentrated force resulted in a non-damaging impact. As depicted in FIG. 7, the resistance of the leading edge sensor after the "Impact" begins to slowly return to the resistance prior to the "Impact." In graph 700, "First cut" and "Second cut" denote two cuts introduced to the example leading edge sensor at two different times. As depicted in FIG. 7, the resistance of the example leading edge sensor increases after each cut.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a wind turbine that includes a plurality of blades, wherein each blade of the plurality of blades includes a leading edge sensor; and
a sensor module that includes:
a measuring module configured to measure a resistance of each of the leading edge sensors, and
a reporting module configured to transmit wear information to a wind turbine operator,
wherein:
the wear information is based on the measured resistances, and
each leading edge sensor includes (i) a first electrode, (ii) a second electrode, and (iii) a resistor that electrically connects the first electrode to the second electrode,
wherein the sensor module includes a storage module configured to store a plurality of impact flags for each blade of the plurality of blades,
wherein the plurality of impact flags includes:
a first impact flag that indicates whether the blade has sustained a type one impact,
a second impact flag that indicates whether the blade has sustained a type two impact, and
a third impact flag that indicates whether the blade has sustained a type three impact.

2. The system of claim 1, wherein the resistor includes (i) carbon black, (ii) styrene ethylene butylene styrene (SEBS), and (iii) toluene.

3. The system of claim 2, wherein:
each leading edge sensor includes a section of leading edge tape,
the first electrode is positioned near a first edge of the section of leading edge tape, and
the second electrode is positioned near a second edge of the section of leading edge tape.

4. The system of claim 1, wherein the storage module is further configured to store an erosion flag that indicates whether a roughness of the plurality of blades is greater than a predetermined threshold.

5. The system of claim 4, wherein the reporting module is configured to transmit a status of (i) the impact flags and (ii) the erosion flag stored in the storage module to the wind turbine operator.

6. The system of claim 5, wherein the sensor module includes a monitoring module configured to:
determine whether the sensor module has been previously started, and
in response to determining that the sensor module has not been previously started:
for each blade of the plurality of blades:
store the measured resistance of the leading edge sensor of the blade as a start resistance in the storage module, and
for each impact flag of the plurality of impact flags of the blade stored in the storage module, set a value of the impact flag to zero,
set a value of the erosion flag stored in the storage module to zero,
calculate an average value of the stored start resistances, and
store the calculated average value of the stored start resistances in the storage module.

7. The system of claim 6, wherein:
the monitoring module is configured to, for each blade of the plurality of blades, store the measured resistance of the leading edge sensor of the blade in the storage module as a stored current resistance, and the sensor module includes an impact module configured to for each blade of the plurality of blades:
compare the stored current resistance with a first threshold value,
in response to determining that the stored current resistance is greater than or equal to the first threshold value, compare the stored current resistance with a second threshold value,
in response to determining that the stored current resistance is greater than or equal to the second threshold value, set the value of the third impact flag of the plurality of impact flags of the blade to one,
in response to determining that the stored current resistance is less than the second threshold value, (i) delay for a predetermined recovery period, (ii) receive the resistance of the leading edge sensor of the blade from the measuring module, and (iii) compare the received resistance with the stored current resistance,
in response to determining that the received resistance is greater than or equal to the stored current resistance, (i) set the value of the first impact flag of the plurality of impact flags of the blade to one and (ii) store the received resistance as the stored current resistance of the blade in the storage module, and
in response to determining that the received resistance is less than the stored current resistance, (i) set the value of the second impact flag of the plurality of impact flags of the blade to one and (ii) store the received resistance as the stored current resistance of the blade in the storage module.

8. The system of claim 6, wherein:
the monitoring module is configured to, for each blade of the plurality of blades, store the measured resistance of the leading edge sensor of the blade in the storage module as a stored current resistance, and
the sensor module includes an erosion module configured to:
calculate an average of the stored current resistances of the plurality of blades,
compare the calculated average of the stored current resistances to a fourth threshold value, wherein the fourth threshold value is equal to the average value of the stored start resistances plus a predetermined erosion factor, and
in response to determining that the calculated average of the stored current resistances is equal to or greater than the fourth threshold value, set the value of the erosion flag stored in the storage module to one.

9. A system comprising:
a wind turbine that includes a plurality of blades, wherein each blade of the plurality of blades includes a leading edge sensor; and
a sensor module that includes:
a measuring module configured to measure a resistance of each of the leading edge sensors, and
a reporting module configured to transmit wear information to a wind turbine operator,
wherein:
the wear information is based on the measured resistances, and
each leading edge sensor includes (i) a first electrode, (ii) a second electrode, and (iii) a resistor that electrically connects the first electrode to the second electrode,
wherein each leading edge sensor includes a section of leading edge tape,
the first electrode is positioned near a first edge of the section of leading edge tape, and
the second electrode is positioned near a second edge of the section of leading edge tape,
wherein the sensor module includes a storage module configured to store a plurality of impact flags for each blade of the plurality of blades,
wherein the plurality of impact flags includes:
a first impact flag that indicates whether the blade has sustained a type one impact,
a second impact flag that indicates whether the blade has sustained a type two impact, and
a third impact flag that indicates whether the blade has sustained a type three impact.

10. The system of claim 9, wherein the storage module is further configured to store an erosion flag that indicates whether a roughness of the plurality of blades is greater than a predetermined threshold.

11. A system comprising:
a wind turbine that includes a plurality of blades, wherein each blade of the plurality of blades includes a leading edge sensor; and
a sensor module that includes:
a measuring module configured to measure a resistance of each of the leading edge sensors, and
a reporting module configured to transmit wear information to a wind turbine operator,
wherein:
the wear information is based on the measured resistances, and
each leading edge sensor includes (i) a first electrode, (ii) a second electrode, and (iii) a resistor that electrically connects the first electrode to the second electrode,
wherein the sensor module includes a storage module configured to store a plurality of impact flags for each blade of the plurality of blades,
wherein the storage module is further configured to store an erosion flag that indicates whether a roughness of the plurality of blades is greater than a predetermined threshold.

12. The system of claim 11, wherein the plurality of impact flags includes:
a first impact flag that indicates whether the blade has sustained a type one impact,
a second impact flag that indicates whether the blade has sustained a type two impact, and
a third impact flag that indicates whether the blade has sustained a type three impact.

13. The system of claim 12, wherein the reporting module is configured to transmit a status of (i) the impact flags and (ii) the erosion flag stored in the storage module to the wind turbine operator.

14. The system of claim 13, wherein the sensor module includes a monitoring module configured to:
determine whether the sensor module has been previously started, and
in response to determining that the sensor module has not been previously started:
for each blade of the plurality of blades:
store the measured resistance of the leading edge sensor of the blade as a start resistance in the storage module, and for each impact flag of the plurality of impact flags of the blade stored in the storage module, set a value of the impact flag to zero,
set a value of the erosion flag stored in the storage module to zero,
calculate an average value of the stored start resistances, and
store the calculated average value of the stored start resistances in the storage module.

15. The system of claim 14, wherein:
the monitoring module is configured to, for each blade of the plurality of blades, store the measured resistance of the leading edge sensor of the blade in the storage module as a stored current resistance, and
the sensor module includes an impact module configured to for each blade of the plurality of blades:
compare the stored current resistance with a first threshold value,
in response to determining that the stored current resistance is greater than or equal to the first threshold value, compare the stored current resistance with a second threshold value,
in response to determining that the stored current resistance is greater than or equal to the second threshold value, set the value of the third impact flag of the plurality of impact flags of the blade to one,
in response to determining that the stored current resistance is less than the second threshold value, (i) delay for a predetermined recovery period, (ii) receive the resistance of the leading edge sensor of the blade from the measuring module, and (iii) compare the received resistance with the stored current resistance,
in response to determining that the received resistance is greater than or equal to the stored current resistance, (i) set the value of the first impact flag of the plurality of impact flags of the blade to one and (ii) store the received resistance as the stored current resistance of the blade in the storage module, and
in response to determining that the received resistance is less than the stored current resistance, (i) set the value of the second impact flag of the plurality of impact flags of the blade to one and (ii) store the received resistance as the stored current resistance of the blade in the storage module.

16. The system of claim 14, wherein:
the monitoring module is configured to, for each blade of the plurality of blades, store the measured resistance of the leading edge sensor of the blade in the storage module as a stored current resistance, and
the sensor module includes an erosion module configured to:
calculate an average of the stored current resistances of the plurality of blades,
compare the calculated average of the stored current resistances to a fourth threshold value, wherein the fourth threshold value is equal to the average value of the stored start resistances plus a predetermined erosion factor, and
in response to determining that the calculated average of the stored current resistances is equal to or greater than the fourth threshold value, set the value of the erosion flag stored in the storage module to one.

* * * * *